(No Model.)
J. PALMER.
FISHING REEL.
No. 250,165. Patented Nov. 29, 1881.
Fig: 1.
Fig: 2.
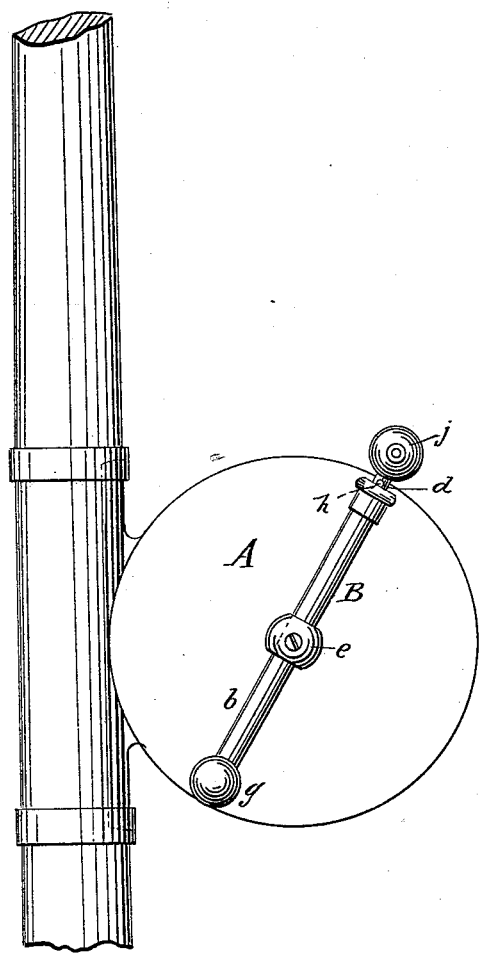
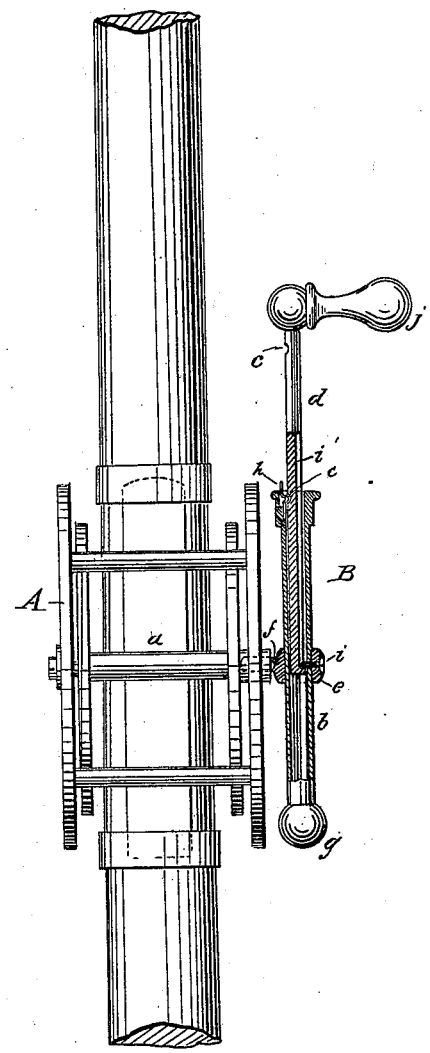
WITNESSES:
Chas. Nida.
C. Sedgwick
INVENTOR:
J. Palmer
BY Munn & Co
ATTORNEYS.

UNITED STATES PATENT OFFICE.

JOHN PALMER, OF NEW YORK, N. Y.

FISHING-REEL.

SPECIFICATION forming part of Letters Patent No. 250,165, dated November 29, 1881.

Application filed September 24, 1881. (No model.)

*To all whom it may concern:*

Be it known that I, JOHN PALMER, of the city, county, and State of New York, have invented a certain useful Improvement in Fishing-Reels, of which the following is a full, clear, and exact description.

My invention consists of a fishing-reel provided with an extensible crank for increasing the length of leverage when necessary when reeling in the line, the extension-arm being adapted to be withdrawn to shorten the lever to ordinary length while casting out the line.

Reference is to be had to the accompanying drawings, forming part of this specification, in which similar letters of reference indicate corresponding parts in both the figures.

Figure 1 is a side elevation of my improved fishing-reel, the extension-arm being shown inclosed in the tube, and Fig. 2 is an elevation of the same, the handle being shown in section.

The reel A is of ordinary construction. Upon the end of the spindle $a$ is fixed the crank B, which is formed of the hollow casing or tube $b$, and the extension-arm $d$, which fits in the said casing or tube. To the center of the tube $b$ is fixed the hub or collar $e$, on which is formed the screw-shank $f$, which enters a screw-socket in the end of the spindle. The outer face of the hub or collar is formed with the counter-sunk screw-cap, in which the screw $i$ is placed for entering the stopped slot $i'$ made in one side of the extension-arm $d$ for holding the arm in the tube or casing and permitting it to slide therein. For holding the arm $d$ in its withdrawn and extended position in the tube or casing I provide the end of the casing with the spring-stop $h$, which engages with the detents $c\,c$ made in the extension-arm, the spring-stop being adapted to be operated by the thumb of the sportsman. Upon the lower end of the casing B is placed the ball $g$, which counterbalances the handle $j$ upon the end of the extension-arm $d$ when withdrawn within the casing.

By this construction and arrangement of the crank it will be seen that all the advantages of the ordinary form of crank are obtained, and that when necessary the leverage may be quickly and easily extended for reeling in the line continually and against strong resistance.

Having thus fully described my invention, I claim as new and desire to secure by Letters Patent—

1. The combination, with a fishing-rod reel having the spindle $a$, of a tubular crank, B, having an extension-arm sliding therein and held adjustably thereto by the spring-stop $h$ and detents $c\,c$, as shown and described.

2. The casing $b$, formed with the hub or collar $e$, provided with the screw-shank $f$, and carrying the screw $i$, in combination with the sliding arm $d$, formed with the slot $i'$, substantially as and for the purposes set forth.

JOHN PALMER.

Witnesses:
J. H. SCARBOROUGH,
C. SEDGWICK.